(12) United States Patent
Mosdal

(10) Patent No.: US 6,186,243 B1
(45) Date of Patent: Feb. 13, 2001

(54) CYLINDER MOUNT FOR AN AGRICULTURAL FRAME

(75) Inventor: Brian Thomas Mosdal, Ankeny, IA (US)

(73) Assignee: Deere & Company, Moline, IL (US)

( * ) Notice: Under 35 U.S.C. 154(b), the term of this patent shall be extended for 0 days.

(21) Appl. No.: 09/546,846

(22) Filed: Apr. 11, 2000

(51) Int. Cl.[7] .................................................. A01B 63/10
(52) U.S. Cl. ..................... 172/667; 172/775; 403/389; 403/396
(58) Field of Search ................................... 172/667, 664, 172/668, 741, 744, 776, 311; 403/384, 391, 388, 389, 396, 399, 385

(56) References Cited

U.S. PATENT DOCUMENTS

| 5,707,170 | 1/1998 | Wattonville | 403/391 |
|---|---|---|---|
| 5,743,341 | 4/1998 | Wattonville | 172/451 |

OTHER PUBLICATIONS

Deere & Company, John Deere Parts Manual 985 Field Cultivator PC2378, pp. A23 and A25, dated Mar. 25, 1997.
Deere & Company, John Deere Parts Manual 685 Chisel Plow PC2444, p. B3, dated Dec. 6, 1996.

Primary Examiner—Christopher J. Novosad

(57) ABSTRACT

A cylinder mounting arrangement for a folding implement includes reversible L-shaped plates supporting an auxiliary tube above a transverse tool supporting beam. The attaching location on the beam can be changed to avoid interference with the desired tool spacing by reversing the plates. The same plates and auxiliary tubes can be used on a number of different implements and with different main frame widths to reduce manufacturing costs and the number of parts that have to be stocked. The reversible plates can be selectively mounted on the main frame with the plates inside or outside of the fore-and-aft tubes connected to the transversely extending tube, depending on the tool placement on the main frame. Therefore, a wide variety of tool spacings can be accommodated in the region under the tube and between the fore-and-aft tubes.

10 Claims, 5 Drawing Sheets

CYLINDER MOUNT FOR AN AGRICULTURAL FRAME

BACKGROUND OF THE INVENTION

1) Field of the Invention

The present invention relates generally to agricultural implement frames and, more specifically, to a versatile mounting arrangement for the wing fold structure on a multi-section implement.

2) Related Art

Frames for large folding implements such as chisel plows, field cultivators and air seeders include an inner or central main frame with outer wings hinged to the main frame to facilitate folding of the wings for a narrower implement transport width. Typically, fold plates are bolted to a transverse tool supporting beam on the main frame which support one end of the folding cylinder. However, various combinations of row or tool spacings and implement widths necessitate that a large number of support bracket spacings must be accommodated on the beam. Often the plates interfere with a desired spacing. The plates can be made with special cut-outs to make room for the support brackets of the row units or tools, but there are still combinations of row spacings and patterns that will result in the plate interfering with one of the brackets. The special plates can greatly increase the number of parts required and thereby increase the cost of the implement. Wing stop arrangements which provide support for the wings in the transport position often require varying sets of components for different types of implements or for implements of the same type having different main frame widths and often do not provide easy wing transport angle adjustment.

BRIEF SUMMARY OF THE INVENTION

It is therefore an object of the present invention to provide an improved wing fold structure mounting arrangement for an implement. It is another object to provide such an arrangement which overcomes most or all of the aforementioned problems.

It is a further object to provide such an improved mounting arrangement for the wing fold structure on an implement, the arrangement facilitating use of a variety of row or tool spacings on implements having different frame widths by reducing or eliminating interference between the mounting arrangement and the brackets or the like which attach the row units or tools to the implement. It is a further object to provide such a structure having simple and inexpensive reversible mounting plates for use with different implements, different implement main frame widths and different tool spacings on the implements.

It is another object to provide an improved mounting arrangement for the wing fold structure on a multi-section implement which includes an adjustable bump stop assembly facilitating use of a single assembly design on implements having different main frame widths and permitting easy adjustment of the wing angle in the transport position.

An implement folding cylinder mount constructed in accordance with the teachings of the present invention includes an auxiliary tube spaced above a transversely extending tube on the main frame to accommodate mounting bolts for the tools or row units. L-shaped plates support the auxiliary tube and can be reversed to change the mounting location on the main frame to avoid interference with the desired tool spacing. The same plates and auxiliary tubes can be used on a number of different implements and with different main frame widths to reduce manufacturing costs and the number of parts that have to be stocked.

The reversible plates can be selectively mounted on the main frame with the plates inside or outside of the fore-and-aft tubes connected to the transversely extending tube, depending on the tool placement on the main frame. Therefore, almost any row or standard spacing can be accommodated in the region under the tube and between the fore-and-aft tubes. A bump stop assembly mounted above the auxiliary tube has adjustable telescoping wing contacts facilitating use of a single assembly design on implements having different main frame widths and permitting easy adjustment of the wing angle in the transport position.

These and other objects, features and advantages of the present invention will become apparent to one skilled in the art upon reading the following detailed description in view of the drawings.

DETAILED DESCRIPTION OF THE DRAWINGS

Figure 1:
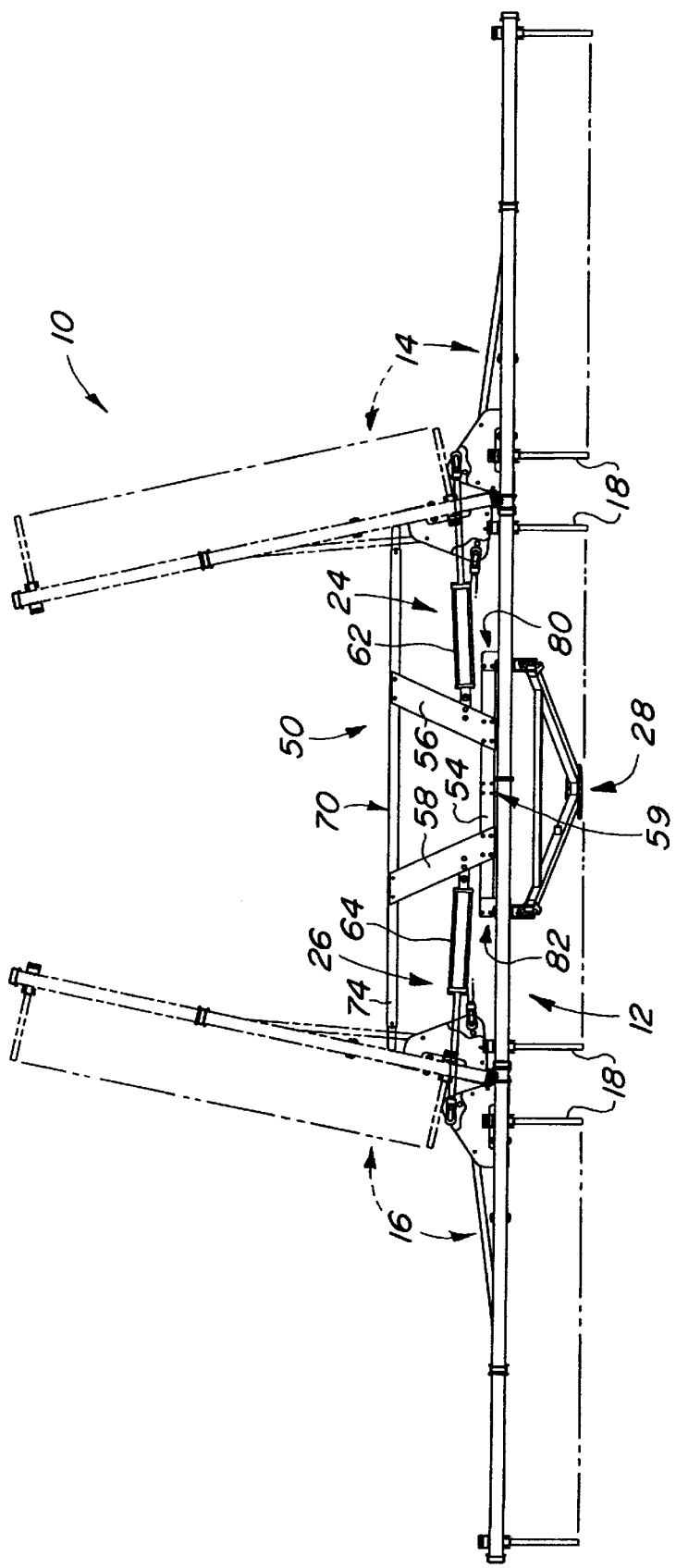
FIG. 1 is a rear view of a multi-section folding implement.
Figure 2:
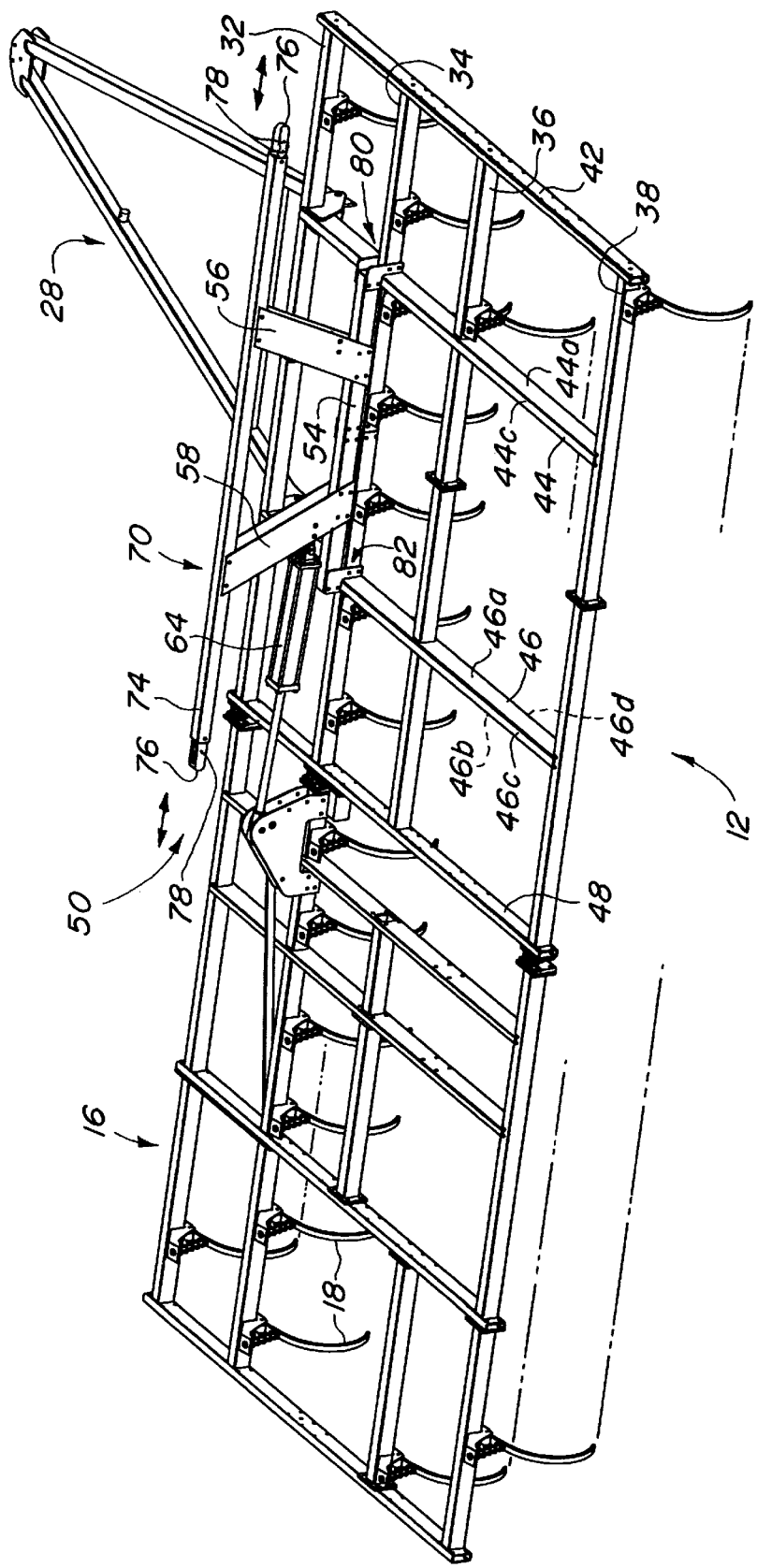
FIG. 2 is an enlarged rear perspective view of a portion of the implement of FIG. 1.

Referring now to FIG. 1, therein is shown a multi-section folding implement 10, such as a field cultivator or chisel plow, having a main or central frame 12 with wing frames 14 and 16 hinged to the main frame 12. The frames 12, 14 and 16 support ranks of conventional earthworking tool assemblies 18 having beam-embracing U-bolt mounting assemblies 18a securing the assemblies 18 in various configurations and transverse spacings. Hydraulically controlled wing fold assemblies 24 and 26 supported from the main frame 12 move the wing frames 14 and 16, respectively, between extended field-working positions (solid lines) and folded transport positions (broken lines). A forward hitch 28 is connected to the main frame 12 and to a tractor (not shown) for forward movement over the ground.

The main frame 12 includes transverse beams or tubes 32, 34, 36 and 38 connected by fore-and-aft extending structural members or beams 42, 44, 46 and 48. As shown, the beams 32–48 have a rectangular, hollow cross section. The beam 44 has opposite upright sidewalls 44a and 44b and top and bottom connecting walls 44c and 44d. Similarly, the beam 46 includes sidewalls 46a and 46b joined by top and bottom walls 46c and 46d.

Hydraulically operated wing fold structure 50 is supported above the main frame 12 and includes an auxiliary tube 54 offset above and extending parallel to the transverse beam 34 to accommodate attachment of the mounting assemblies on the beam 34 between the beams 44 and 46. The tube 54 also provides additional structural rigidity to the main frame 12. Two pairs of upwardly and outwardly angled mounting plates 56 and 58 are bolted to the forward and aft faces of the tube 54 and support the base ends of wing fold cylinders 62 and 64 which have rod ends connected to the wing frames 14 and 16 for moving the wing frames between the field-working position (solid lines of FIG. 1) and the transport position (broken lines of FIG. 1). An additional pair of central mounting plates (not shown) connect the central portions of the tubes 34 and 54 at locations shown at 59 in FIG. 1.

An adjustable bump stop assembly 70 is bolted between the upper ends of the mounting plates 56 and 58 and provides a positive stop for the wings 14 and 16 in the transport position. The bump stop assembly includes a hollow transverse tube 74 having apertured opposite ends which telescopingly receive adjustable contacts 76 having a plurality of transversely spaced apertures 78 which align with the apertures in the ends of the tube 74. A bolt or pin is inserted through the apertures to secure the contacts 76 in the desired telescoped position which depends on wing angle and main frame width. The adjustable bump stop assembly 70 provides easy adjustability of the transport position wing angle and facilitates use of the same assembly on various types of implements and on implements having different main frame widths. The single tube 74 may be replaced with two tubes (not shown) which are angled upwardly in the outward directions, with the inner portions of the tubes connected between the mounting plates attached at the locations 59.

Figure 6:
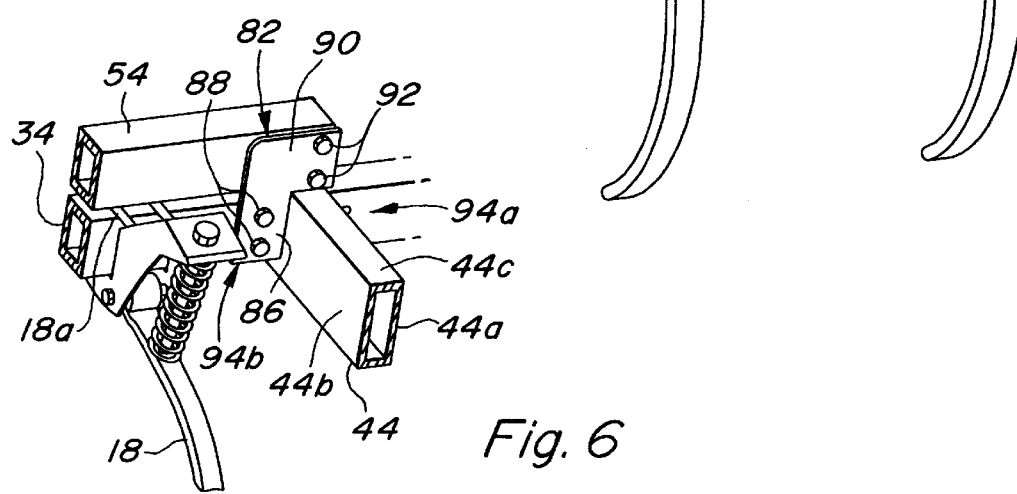
FIG. 6 is a rear perspective view of a portion of the plate mounting area on the frame with the plates reversed.

The auxiliary tube 54 is supported above the beam 34 by generally identical sets of L-shaped plates 80 and 82 connected to opposite faces of the ends of the tube 54. Each of the L-shaped plates includes an apertured upright leg 86 with spaced apertures for receiving main frame mounting bolts 88, and a laterally extending horizontal portion 90 extending from the upright leg 86 and apertured to receive vertically spaced tube mounting bolts 92 which extend through corresponding apertures in the ends of the auxiliary tube 54. The transversely extending beam 34 includes first and second apertured portions 94a and 94b (FIG. 6) located closely adjacent the sides 44a and 44b, respectively, of the fore-and-aft extending structural member 44. The beam 34 includes similar apertured portions adjacent the sides 46a and 46b of the member 46. The spacings of the apertures in the beam 34 is identical to the spacing of the apertures in the upright legs 86 of the L-shaped plates so the plates are selectively mountable in a first position as shown in FIGS. 3–5 with legs 86 to the right of the members 44 and 46 and with the horizontal portions 90 extending to the left over the top walls 44c and 46c.

Figure 3:
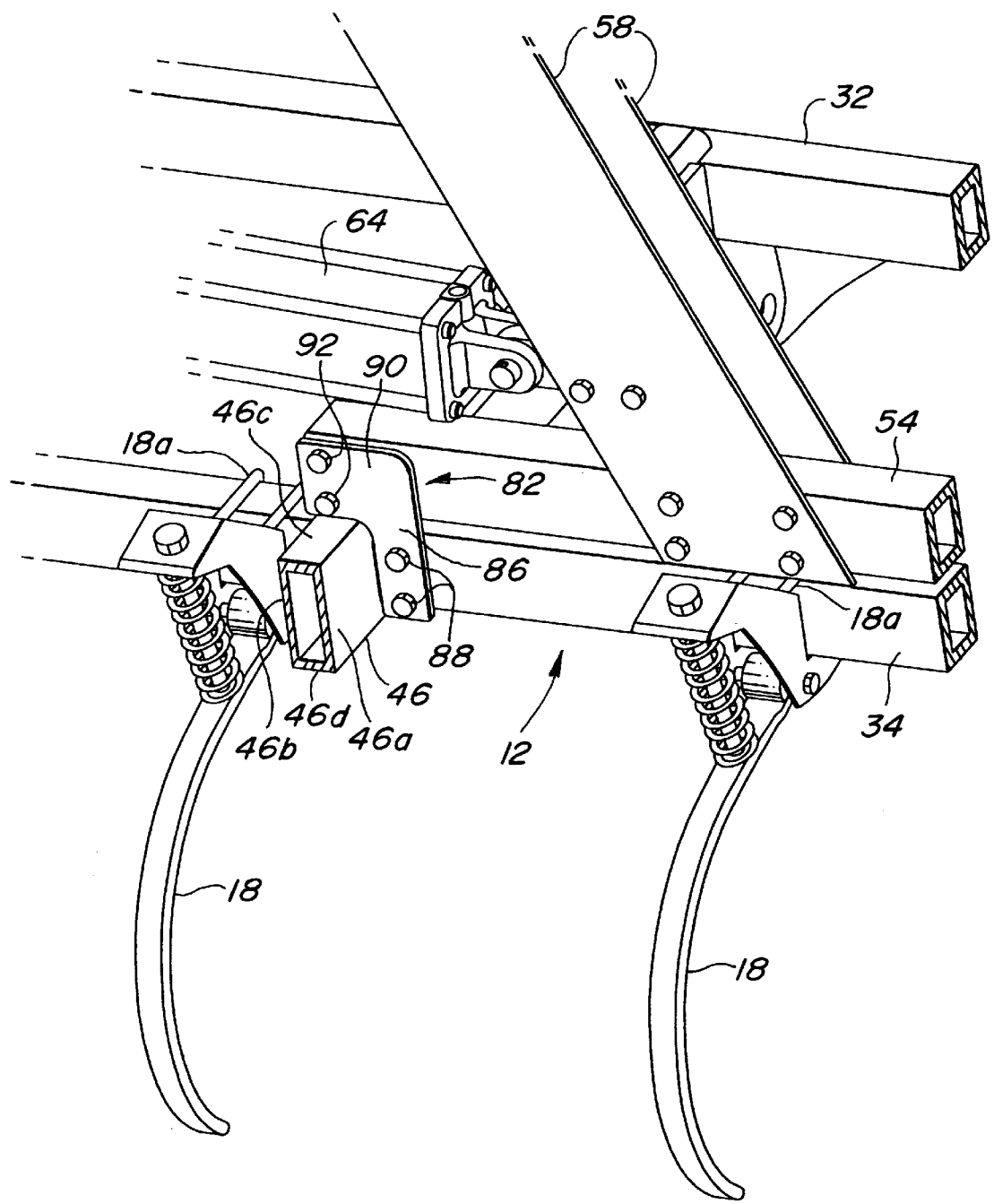
FIG. 3 is an enlarged rear perspective view of the wing fold area on the implement of FIG. 2 and showing a reversible plate tube connection at one end of the auxiliary tube.
Figure 4:
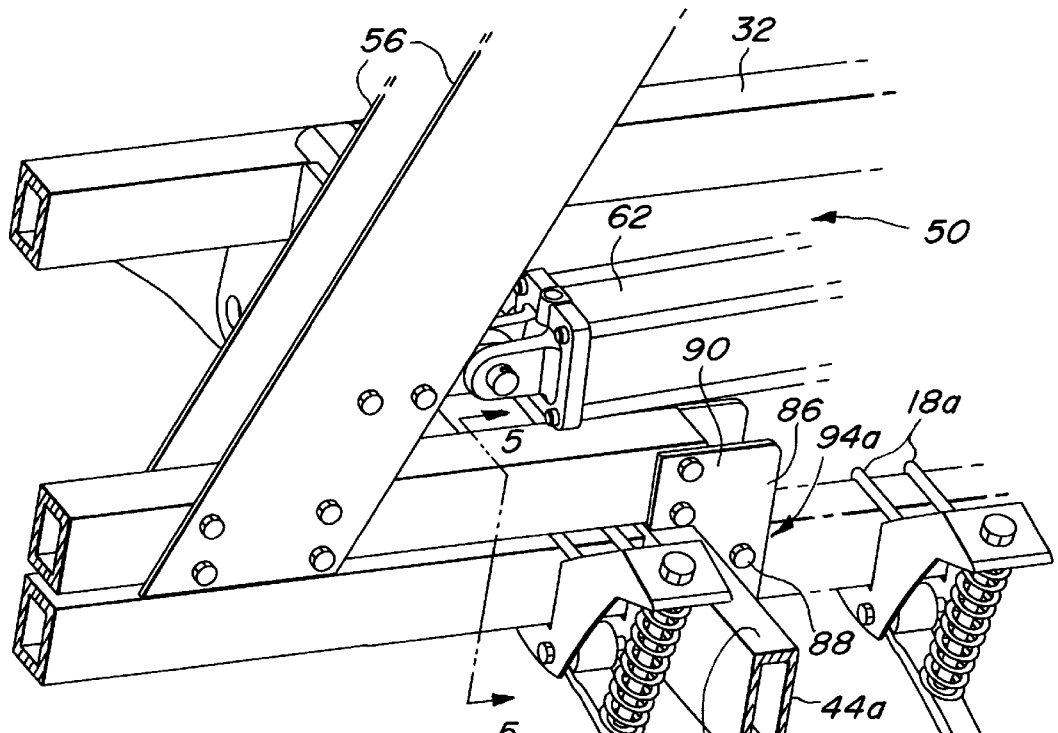
FIG. 4 is a view similar to that of FIG. 3 but showing the reversible plates at the opposite end of the auxiliary tube.
Figure 5:
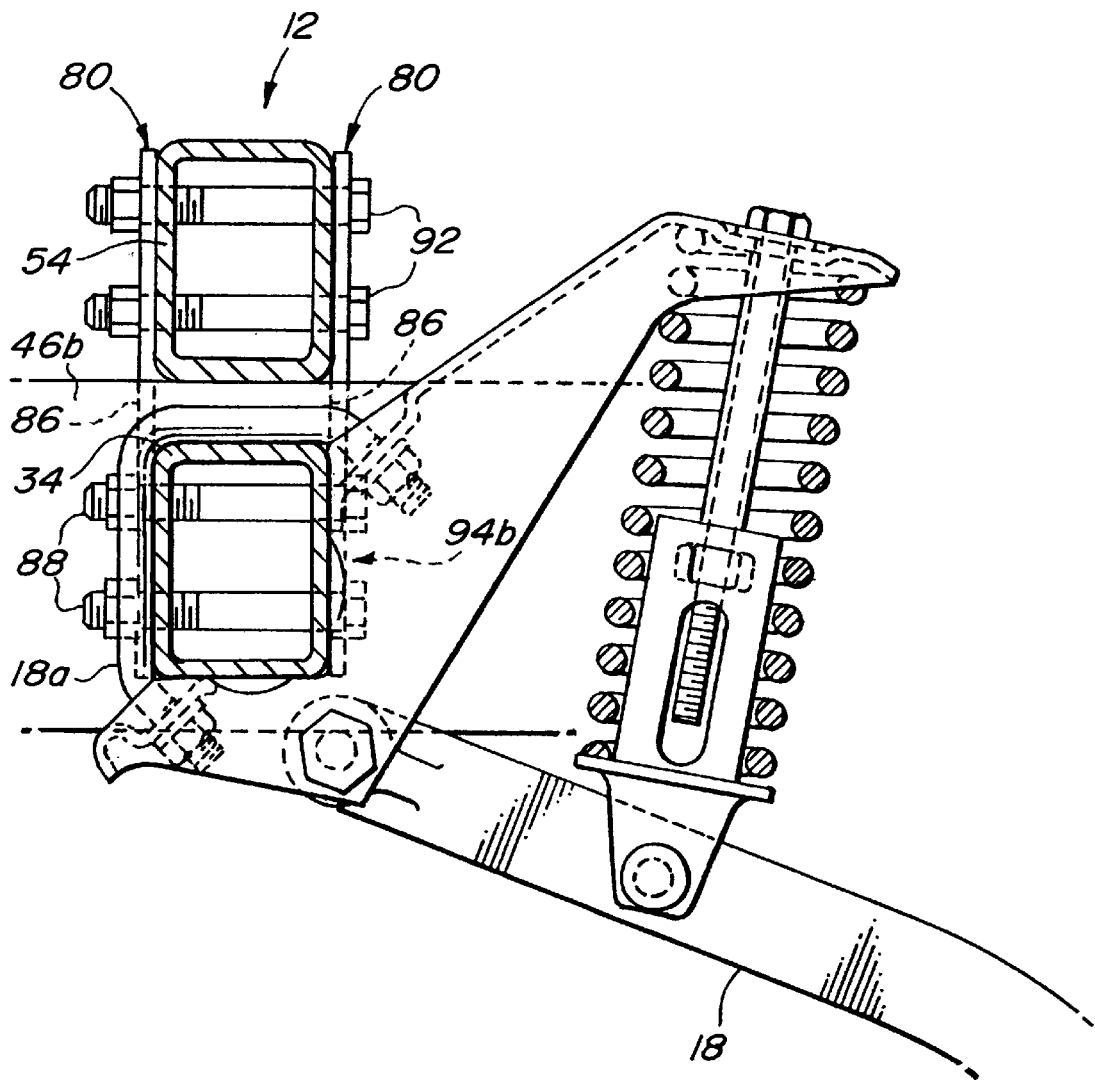
FIG. 5 is a view taken generally along lines 5—5 of FIG. 4.

In the position shown in FIGS. 3–5, the earthworking tool assemblies 18 can be placed closely adjacent to the sides 44b and 46b. If the location of the legs 86 adjacent the sides 44a and 46a interferes with a desired spacing of one of the mounting assemblies 18a, the set of plates 80 or 82, or both, can be reversed (see, for example, FIG. 6) so the legs 86 of the potentially interfering plates are then positioned to the left of the corresponding fore-and-aft extending structural member and the horizontal portions 90 extend in the opposite lateral direction (i.e., to the right). The apertures in the plates are centered about the fore-and-aft tube to provide symmetry so that when the plates are reversed, the same apertures can be utilized. With the plate construction as shown, the auxiliary tube 54 is positioned the same relative to the frame regardless of the orientation of the legs 86, and the legs 86 for the plates at one end of the tube 54 can be oriented in a direction opposite the legs of the plates for the opposite end.

Having described the preferred embodiment, it will become apparent that various modifications can be made without departing from the scope of the invention as defined in the accompanying claims.

What is claimed is:

1. In a folding implement adapted for forward movement over the ground and having a main frame with a transversely extending beam and fore-and-aft extending structural member having opposite sides, earthworking tools supported by mounting structures spaced along the transversely extending beam in selectively spaced arrangements, and a wing frame pivotally connected to the main frame for movement with a wing fold cylinder between an extended field-working position and a folded transport position, and fore-and-aft extending beams connecting the transversely extending beams, a cylinder mount comprising:

a mounting tube;

a cylinder support connected to the mounting tube and receiving an end of the fold cylinder;

plate structure connected between the mounting tube and the transversely extending beam and supporting the beam in an offset and generally parallel relationship to the mounting tube to facilitate attachment of the mounting structure on the beam adjacent the mounting tube, the plate structure being rotatable 180 degrees between first and second positions about an upright axis to vary the location of the plate relative to the beam to avoid interference between the plate and the mounting structures on the beam.

2. The cylinder mount as set forth in claim 1 wherein the plate structure comprises an L-shaped member, the L-shaped member having an upright leg positioned adjacent the first side of the fore-and-aft extending structural member and a laterally extending portion extending parallel to the transversely extending beam.

3. The cylinder mount as set forth in claim 2 wherein the laterally extending portion of the L-shaped member extends over the structural member towards the second side of the structural member when the plate is in the first position.

4. The cylinder mount as set forth in claim 2 wherein the upright leg is positioned against the first side of the structural member when in the first position and against the second side when in the second position thereby facilitating selective attachment of the mounting structures immediately adjacent either side of the structural member.

5. The cylinder mount as set forth in claim 4 wherein the laterally extending portion of the L-shaped member extends over the structural member towards the second side of the structural member when the plate is in the first position.

6. The cylinder mount as set forth in claim 1 further comprising a bump stop assembly supported from the mounting tube including a transversely extending tube having a hollow end and slidingly receiving a wing contact in the hollow end, the wing contact selectively positionable in the hollow end to vary the position of the wing frame relative to the main frame when the wing frame is in the transport position.

7. In a folding implement adapted for forward movement over the ground and having a main frame with a transversely extending beam and fore-and-aft extending structural member having opposite sides connected to the transversely extending beam, earthworking tools supported by mounting structure spaced along the transversely extending beam in selectively spaced arrangements, and a wing frame pivotally connected to the main frame for movement with a wing fold cylinder between an extended field-working position and a folded transport position, a cylinder mount arrangement comprising:

a mounting tube;

a cylinder support connected to the mounting tube and receiving an end of the fold cylinder;

plate structure connected between the mounting tube and the transversely extending beam and supporting the beam in an offset and generally parallel relationship to the mounting tube to facilitate attachment of the mounting structure on the beam adjacent the mounting tube, the plate structure including a first L-shaped plate having an apertured upright leg with spaced apertures and a laterally extending horizontal portion extending from the upright leg;

wherein the transversely extending beam includes first and second apertured portions located adjacent the opposite sides of the fore-and-aft extending structural member, the apertured portions including holes adapted for alignment with the spaced apertures, the L-shaped plate selectively mountable in a first position wherein the holes in the first apertured portion align with the spaced apertures and the horizontal portion extends in a first lateral direction, and a second position which is reversed from the first position and wherein the holes in the second apertured portion align with the spaced apertures and the horizontal portion extends in a lateral direction opposite the first lateral direction; and connectors extending through the aligned holes and apertures and selectively securing the L-shaped plate in the first or second position so the mounting structure can be selectively placed adjacent the fore-and-aft extending structural member on the side of the structural member opposite the side adjacent the upright leg.

8. The cylinder mount arrangement as set forth in claim 7 wherein the plate structure includes a second L-shaped plate generally identical to the first L-shaped plate, the first and second L-shaped plates being reversible to facilitate mounting of the plates on a selected side of the fore-and-aft extending structural member.

9. The cylinder mount arrangement as set forth in claim 8 wherein the apertures are centered relative to the fore-and-aft structural member for symmetry and the plate supports the mounting tube in the same position relative to the main frame regardless of the side selected.

10. The cylinder mount as set forth in claim 7 further comprising a bump stop assembly supported from the mounting tube and including a transversely extending tube having an end with a telescoping wing contact to vary the position of the wing frame relative to the main frame when the wing frame is in the transport position.

* * * * *